(12) United States Patent
Desai et al.

(10) Patent No.: US 7,887,012 B2
(45) Date of Patent: Feb. 15, 2011

(54) INSERT FOR TUBE RETAINING BRACKET

(75) Inventors: Saurabh Desai, Troy, MI (US); Matthew Sasina, Farmington Hills, MI (US); Stephen Frederiksen, Dearborn Heights, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 12/415,558

(22) Filed: Mar. 31, 2009

(65) Prior Publication Data

US 2010/0243824 A1  Sep. 30, 2010

(51) Int. Cl.
*F16L 3/16* (2006.01)

(52) U.S. Cl. .............................. 248/55; 24/530; 24/555; 24/564; 248/71; 248/74.1; 248/74.2; 248/68.1

(58) Field of Classification Search ................ 248/68.1, 248/71, 74.1, 74.2, 74.3, 55, 65; 24/530, 24/555, 564

See application file for complete search history.

(56) References Cited

U.S. PATENT DOCUMENTS

| | | | |
|---|---|---|---|
| 6,354,545 B1* | 3/2002 | Liao | 248/214 |
| 7,011,277 B2* | 3/2006 | Mizukoshi et al. | 248/68.1 |
| 7,201,352 B2* | 4/2007 | Kawai | 248/74.1 |
| 7,207,528 B2* | 4/2007 | Kato | 248/55 |
| 7,278,190 B2* | 10/2007 | Fischer et al. | 24/530 |
| 7,600,723 B2* | 10/2009 | Borchers | 248/68.1 |
| 2004/0217236 A1* | 11/2004 | Shibuya | 248/68.1 |
| 2007/0246614 A1* | 10/2007 | Allmann et al. | 248/65 |
| 2007/0278357 A1* | 12/2007 | Pizzi | 248/74.1 |
| 2008/0272248 A1* | 11/2008 | Pothanikat et al. | 248/55 |
| 2009/0140106 A1* | 6/2009 | Johnson et al. | 248/55 |

* cited by examiner

*Primary Examiner*—Ramon O Ramirez
(74) *Attorney, Agent, or Firm*—Harness, Dickey & Pierce, PLC (57) ABSTRACT

A retaining bracket for holding conduits may employ a first half or stationary portion defining a semi-circular first conduit holding portion and a semi-circular second conduit holding portion. A second half or movable portion may be foldable onto the stationary portion such that a first arcuate groove and a second arcuate groove of the movable portion match the first and second conduit holding portions, respectively, to accommodate the cylindrical conduits. A first rigid binder piece may contact a long side of the stationary portion and attach to a first compressible insert and a second compressible insert. The first compressible insert may reside within the first conduit holding portion and the second compressible insert may reside within the second conduit holding portion and compress against the conduits, respectively. The binder and inserts may install into the retain bracket before or after the movable portion is closed onto the stationary portion.

23 Claims, 5 Drawing Sheets

INSERT FOR TUBE RETAINING BRACKET

FIELD

The present disclosure relates to a retaining bracket to prevent lateral and transverse movement of conduits such as electrical wiring and fluid piping.

BACKGROUND

This section provides background information related to the present disclosure which is not necessarily prior art. Modern vehicles employ numerous conduits that must be supported or held for at least a portion of the length of a vehicle, such as under or within the body of a vehicle. Conduits may include electrical conduits, such as for wiring and wiring harnesses, and fluid conduits, such as brake fluid piping, transmission fluid piping, washer fluid piping and coolant fluid piping. The device used to hold the conduit may include some type of anchoring fixture for securing the holding device to a portion of the article to which the conduit and holding device are held.

While many holding devices, such as those utilized in the automobile industry, have been deemed satisfactory for their purposes, such holding devices are not without their share of limitations. One such limitation is the degree to which a holding device prevents lateral and longitudinal motion of the conduit being secured with respect to the holding device. Another limitation is the degree to which a single size holding device is capable of securing different sizes of conduits.

What is needed then is conduit holding device, such as an insert and binder that can accommodate a variety of diameters of conduits while dampening vibration and noise, while preventing or lessening lateral and longitudinal movement of such conduit and provide optimal holding force against the conduit.

SUMMARY

This section provides a general summary of the disclosure, and is not a comprehensive disclosure of its full scope or all of its features. A retaining bracket for holding conduits, such as vehicle brake lines, may employ a first half or stationary portion that defines a semi-circular first conduit holding portion and a semi-circular second conduit holding portion. A second half, or movable portion, may define a first groove and a second groove such that when the movable portion is folded over and locked onto the stationary portion, the first conduit holding portion corresponds to or aligns with the first arcuate groove and the second conduit holding portion corresponds to or aligns with the second arcuate groove to form two circular conduit or tubing channels. The retaining bracket may be configured to secure one or more conduits.

The retaining bracket may further employ a first rigid binder piece that may contact a first long side of the stationary portion, such as where the conduit openings are located. A first compressible insert with a first compressible insert first end may be connected to the first binder piece and a second compressible insert with a second compressible insert first end may be connected to the first rigid binder piece. The first compressible insert may reside within the first conduit holding portion and the second compressible insert may reside within the second conduit holding portion. The retaining bracket may further employ a first compressible insert second end, a second compressible insert second end, and a second rigid binder piece connected to the first compressible insert second end and the second compressible insert second end.

The first insert may compress against a wall of the first conduit holding portion and the second insert may compress against a wall of the second conduit holding portion. The first rigid binder piece, the second rigid binder piece, the first compressible insert and the second compressible insert may be connected serially to form a rectangular structure. The rectangular structure may be installed over and around the wall of the first conduit holding portion and the wall of the second conduit holding portion such that the walls protrude through the rectangular structure. Alternatively, the rectangular structure may reside at a level such that the walls do not protrude through the rectangular structure. The first rigid binder and the second rigid binder may reside only outside of the physical perimeter of the stationary portion and the movable portion. That is, after installation of the binder(s) and inserts into the bracket, the inserts do not remain in either the first or the second conduit holding parts.

The retaining bracket may utilize the rectangular structure with the compressible inserts or a U-shaped structure with such compressible inserts may be utilized. The U-shaped structure may employ a first prong attached to a first compressible insert second end and a second prong attached to a second compressible insert second end such that the first and second prongs reside against a second long side of the stationary portion. The first long side and the second long side of the stationary portion may be parallel with the first long side and the second long side of the stationary portion defining openings of the semi-circular first conduit holding portion and the semi-circular second conduit holding portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
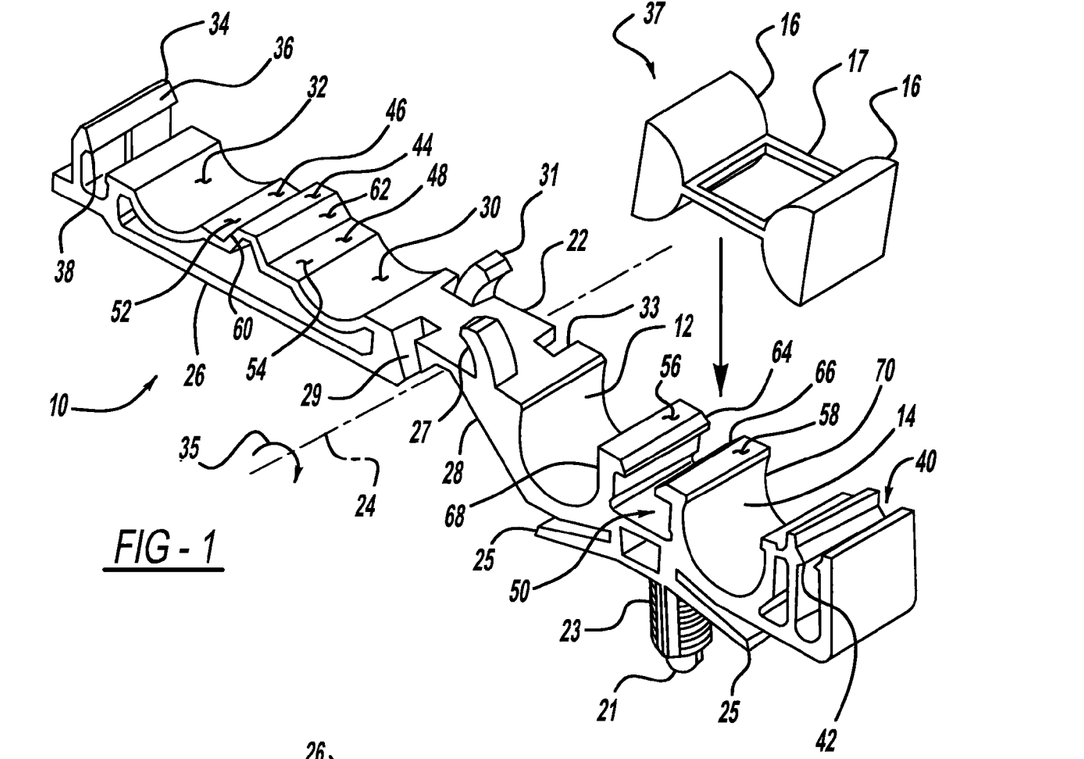
FIG. 1 depicts a perspective view of a conduit retaining bracket according to an embodiment of the present teachings.
Figure 2:
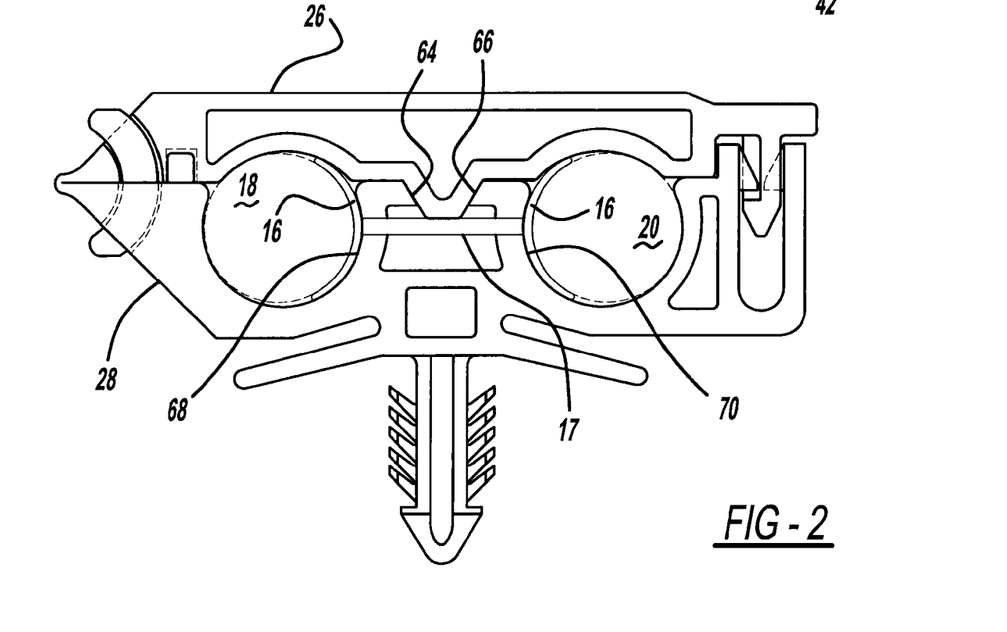
FIG. 2 depicts a side view of a conduit retaining bracket according to an embodiment of the present teachings.
Figures 3A, 3B:
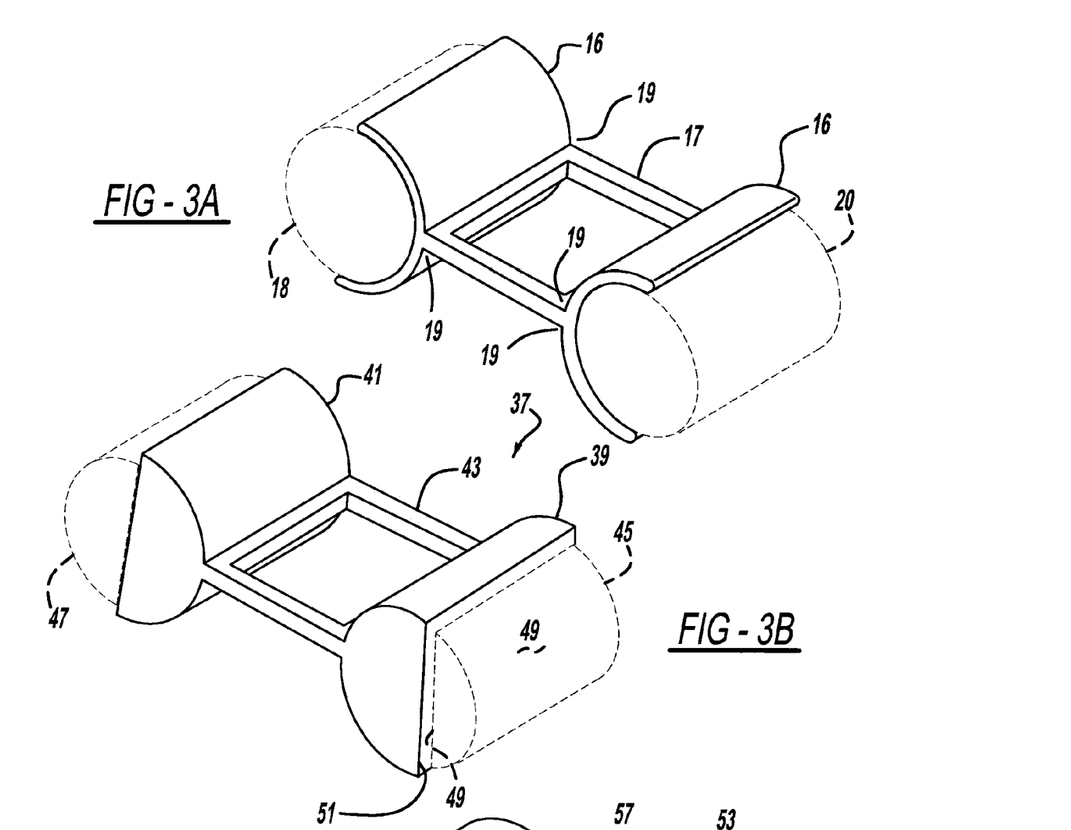
FIG. 3A depicts a perspective view of an insert portion of the conduit retaining bracket according to an embodiment of the present teachings.
FIG. 3B depicts a perspective view of an insert portion of the conduit retaining bracket according to an embodiment of the present teachings.

Example embodiments will now be described more fully with reference to the accompanying drawings. With reference now to FIGS. 1-9, structure and features of the invention will be explained. Turning first to FIG. 1, depicted is a retaining bracket 10 with first conduit holding part 12 and second conduit holding part 14. Conduit holding parts 12, 14 are operative with a compressible insert 16, and binder 17, also depicted in FIG. 3A, to securely hold conduits 18, 20 in place within the retaining bracket 10. Conduit 18 and conduit 20, also depicted in FIG. 3A, are examples of rigid metal tubing, such as vehicle brake fluid tubing or transmission fluid tubing, pliable hoses, such as vehicle washer fluid hoses, or plastic conduit for electrical wires, or even a rigid electrical wiring harness. Conduits 18, 20 are intended as examples of how retaining bracket 10 may be employed.

Continuing with FIG. 1, retaining bracket 10 may employ a flat mid-section 22 that also functions as a flexible hinge area about which retaining bracket 10 may pivot or bend. As depicted in FIG. 1, retaining bracket 10 may pivot about dashed line 24 to permit the enclosure of conduits, such as conduit 18 and conduit 20, within first conduit holding part 12 and second conduit holding part 14, respectively. As depicted in FIG. 2, conduits 18 and 20 may be secured in place with the movable portion 26. Movable portion 26 is referred to as such because it is the half of the retaining bracket 10 that is moved or folded over on stationary portion 28. Movable portion 26 may have a first arcuate groove 30 and a second arcuate groove 32 to accommodate the shape of the conduits 18, 20.

FIG. 1 further depicts protruding closing prong 34 that further employs wedge 36 with hook 38. Wedge 36 with hook 38 protrudes transversely from closing prong 34, as depicted in FIG. 1. When movable portion 26 is folded over stationary portion 28, in accordance with arrow 35 with dashed line 24 acting as the hinge or fold line, wedge 36 lodges within gap 40 of stationary portion 28 to the extent that first hook 38 lodges securely against second hook 42 to resist any opening or separation motion of the movable portion 26 relative to the stationary portion 28. While closing prong 34, wedge 36 and first hook 38 secure movable portion 26 to second hook 42 within gap 40 of stationary portion 28, other features of movable portion 26 and stationary portion 28 secure the conduits 18, 20. Continuing, movable portion 26 has protruding portion 44 that lies between recessed portions 46, 48. When in use with movable portion 26 folded over stationary portion 28, protruding portion 44 becomes situated within gap 50 with land 52 of recessed portion 46 and land 54 of recessed portion 48 being forced against lands 56, 58, which are between the first and second conduit holding parts 12, 14 of stationary portion 28. The lands 46, 48 may be parallel to each other to provide a consistent wedge effect and holding force to conduits 18, 20. Protruding portion 44 may have slanting sides 60, 62 relative to lands 46, 48 and protruding portion 44 top, which may also be a land and parallel to lands 46, 48.

Slanting sides 60, 62 of movable portion 26 wedge against slanting sides 64, 66 of stationary portion 28 and force interior wall 68 and interior wall 70 away from each other and against conduits 18, 20, respectively.

Retaining bracket 10 may be attached to a structure, such as a vehicle frame or vehicle body part, using anchor 21 with flexible protrusions 23. In securing retaining bracket 10, anchor 21 may be pushed into a hole in a vehicle frame or body causing flexible protrusions 23 to bend or flex to provide a force against the inside diameter of the bore of the hole, or flexible protrusions 23 may pass entirely through a hole and restore to their pre-installed and pre-flexed position. In either attachment method, anchor 21 may be secure and retaining bracket 10 may be prevented from dislodging form its place of installation. Cantilever protrusions 25, which may protrude from stationary portion 28, may provide a force opposite to that provided by flexible protrusions 23, when anchor 21 is installed through a hole with at least some of the flexible protrusions 23 protruding completely through such hole. Flexible protrusions do not have to pass completely through a securing hole. To also assist retaining bracket 10 in resisting motion from external forces when installed and in use, a first hinge lock 27 and corresponding hole or groove 29 and a second hinge lock 31 with a corresponding hole or groove 33 are positioned on the hinging side, that is, the side opposite closing prong 34 of retaining bracket 10, when retaining bracket 10 is closed and locked. The hinge locks 27, 31 provide strength to the hinging side of retaining bracket 10 by resisting any opening motion of movable portion 26.

As depicted in FIG. 2, when movable portion 26 is installed in place on stationary portion 28, protruding portion 44, and more specifically, slanting side 60 and slanting side 62 force wall 68 and wall 70 away from each other and into insert 16 and thus, conduit 18 and conduit 20, respectively. Before explaining retaining bracket 10 operation more specifically, insert 16 and binder 17 will be presented in more detail. FIG. 1 depicts the insert 16 in an uncompressed and relaxed state attached to binder 17. FIG. 2 depicts insert 16 in a compressed, unrelaxed state connected to binder 17 within the retaining bracket 10, while FIG. 3A depicts an enlarged view of the insert 16 and attached binder 17 with conduits 18, 20 compressing portions of the compressible insert 16. The binder 17 and inserts 16 may be attached in a variety of fashions, such as in a heat application process, such as welding, or with an adhesive at room temperature, as examples. As depicted in FIG. 3A, the connective juncture of inserts 16 and binder 17 is at juncture 19 and such attachment of binder 17 and inserts 16 may be for the length of the insert 16 against binder 17.

As depicted in FIG. 3A, the inserts 16 may be in a compressed state, relative to their uncompressed state depicted in FIG. 1, because the inserts 16 must be compressed to situate or install each conduit 18, 20 within its respective conduit holding part 12, 14 before closing or folding over movable portion 26 to cover conduits 18, 20 and secure closing prong 34 within gap 40 of stationary portion 28. To achieve compression or degree of volume compaction necessary to accommodate conduits, inserts 16 may be a rubber, plastic, or metal material or any combination of the three, or other suitable compressible material. Additionally, the inserts 16 may be a rubber-coated plastic, rubber-coated metal, of plastic-coated metal. When the material is rubber or plastic, the inserts may be solid or hollow to permit compression or collapsing upon itself. When the material is metal, the inserts may be resilient and may also be spring-like, to provide spring-back or a restoring force against conduits 18, 20.

While the description and embodiment associated with FIG. 3A has been described as an insert 16 and binder 17 as being two separate pieces that may be joined together in some fashion, such as heat bonding, the insert 16 and binder 17 may be a single piece, that is, not two joined pieces, and manufactured from a single material such as plastic, rubber, metal or any resilient or semi-resilient material.

FIG. 3B depicts another embodiment of the present teachings. More specifically, FIG. 3B depicts an insert assembly 37 with a first D-shaped portion 39 and a second D-shaped portion 41 that are linked or connected with a frame or binder 43, which may be rigid (non-compressible) or flexible. In the example depicted in FIG. 3B, the D-shaped portions 39, 41 and the binder 43, that together make-up the insert assembly 37, which may be a single rigid, non-compressible piece. Moreover, the insert assembly 37 may be manufactured from a variety of materials. For instance, the insert assembly 37 may be rubber, plastic, metal, or a hybrid such as rubber coated plastic, rubber coated metal, or plastic coated metal.

Continuing with FIG. 3B, the D-shaped portions 39 and 41 are configured to mate to or abut against corresponding conduit sections 45 and 47, for example. More specifically, a geographic feature of conduit section 45, such as flat surface 49 contacts, mates or abuts against flat surface 51 of D-shaped portion 39. The insert assembly 37 may conveniently be fitted into and reside within the retaining bracket 10, as depicted in FIG. 1.

Figure 3C:
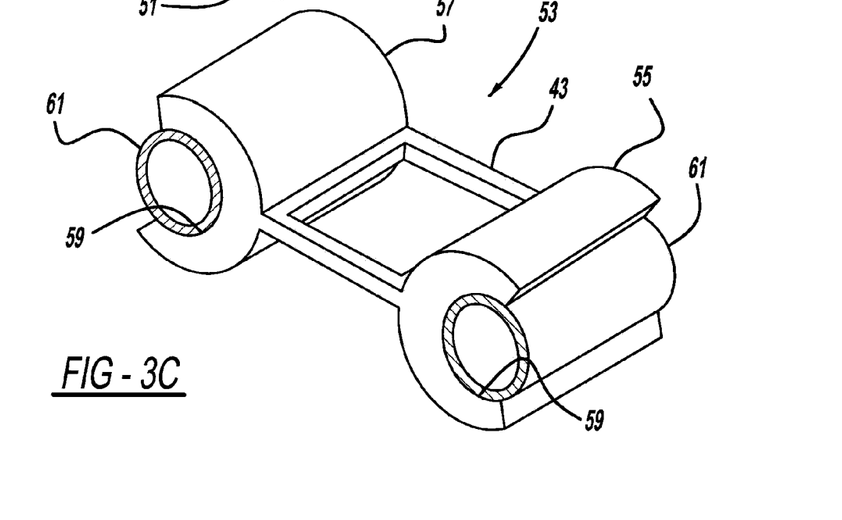
FIG. 3C depicts a perspective view of an insert portion of the conduit retaining bracket according to an embodiment of the present teachings.

FIG. 3C depicts another example of a bracket insert assembly 53 with a different geometric configuration. More specifically, the insert assembly 53 has inserts 55, 57 with a specific geometric contour 59, such as a semi-circle molded into or formed into the insert(s) 55, 57 to accommodate a tube or tubes 61, which may have a contour to conform or mate against that of the insert 55, 57. As depicted in FIG. 3C, the fluid conduit or tube 61 will not only contact an insert 55, 57 of the insert assembly 53, but also portions of the bracket within which the inserts 55, 57 are situated. As depicted in FIG. 3C, the geometric contour 59 may be for a circular conduit, such as a fluid line in a vehicle. While the contour 59 in the insert 55 is depicted as a semi-circle, the contour 59 may be another geometric shape. As with the embodiment depicted in FIG. 3B, the embodiment depicted in FIG. 3C may be a solid, rigid, one piece design and may be molded in one or combination of materials noted above in conjunction with the description of FIG. 3B. A multitude of geometric configurations are possible for the insert 55, 57 that may contact a fluid conduit. Moreover, the geometric shape of the insert 55, 57 may be molded to match an exterior contour of the conduit desired to be secured within retaining bracket 10. When the conduit(s) 61 are secured within the retaining bracket 10, first conduit holding part 12 and second conduit holding part 14 will also contact the conduit(s) 61 to prevent the conduit(s) 61 from moving within the retaining bracket 10.

Figure 4:
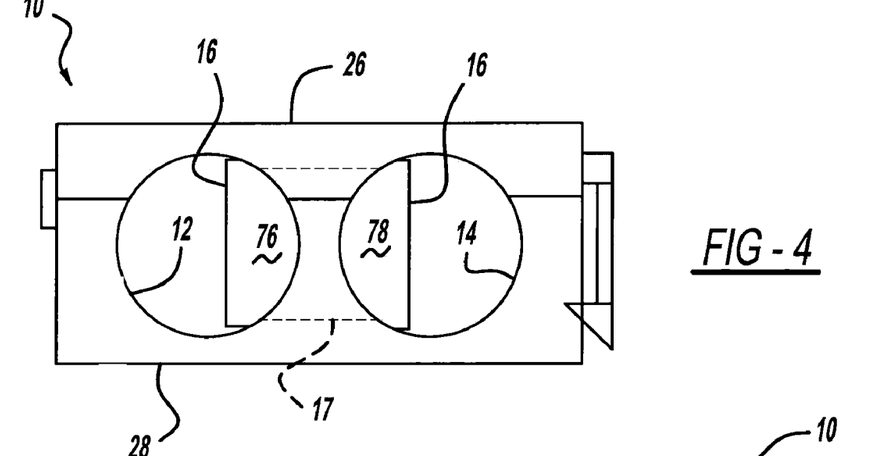
FIG. 4 depicts a side view of an insert portion of the conduit retaining bracket according to an embodiment of the present teachings.

Turning now to FIGS. 4-9, example embodiments of inserts will be presented. FIGS. 4-7 depict front views of the retaining bracket 10. A front view is considered the view seen when retaining bracket 10 is observed axially through first conduit holding part 12 and second conduit holding part 14 when movable portion 26 is folded over and locked onto stationary portion 28. FIG. 4 depicts D-shaped insert 76 and a D-shaped insert 78. In one example, D-shaped inserts 76, 78 may be molded from the same material as binder 17 that links inserts 76, 78. Alternatively, inserts 76, 78 may be made from a material that is different from binder 17 that links to inserts 76, 78. In such a situation, inserts 76, 78 may be joined, fastened or connected to binder 17 in some fashion, such as with an adhesive. In one example, inserts 18, 20 may be made of a plastic, such as in a single molded piece, and then coated in a rubber to grip the tubing or conduit against which inserts 18, 20 compress and reside. When inserts 18, 20 contact the installed conduit, the conduit will resist longitudinal and lateral motion which may be caused by an exterior force, such as occurs when a vehicle strikes a hole in a road. As depicted in FIG. 4, D-shaped inserts 76, 78 occupy a portion of holding parts 12, 14 before installation of any conduit into retaining bracket 10. After installation of conduits, such as conduits 18, 20 of FIG. 3A, D-shaped inserts 76, 78 of FIG. 4 may appear as compressed inserts 18, 20 of FIG. 3A. Compressed inserts 18, 20 may securely force conduits 18, 20 against an adjacent wall of a corresponding holding part 12,14.

Figure 5:
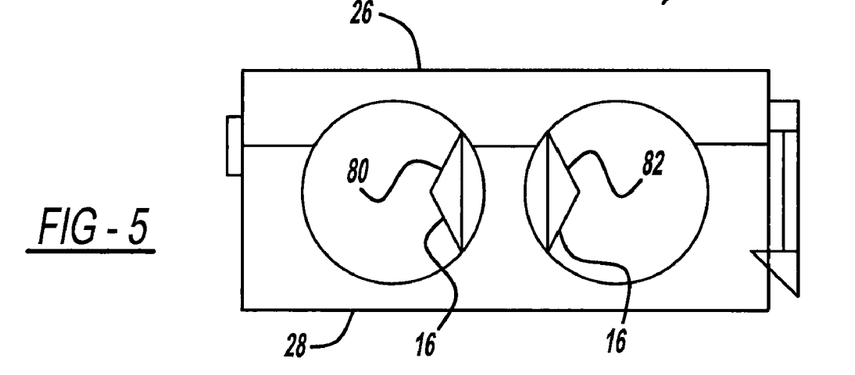
FIG. 5 depicts a side view of an insert portion of the conduit retaining bracket according to an embodiment of the present teachings.
Figure 6:
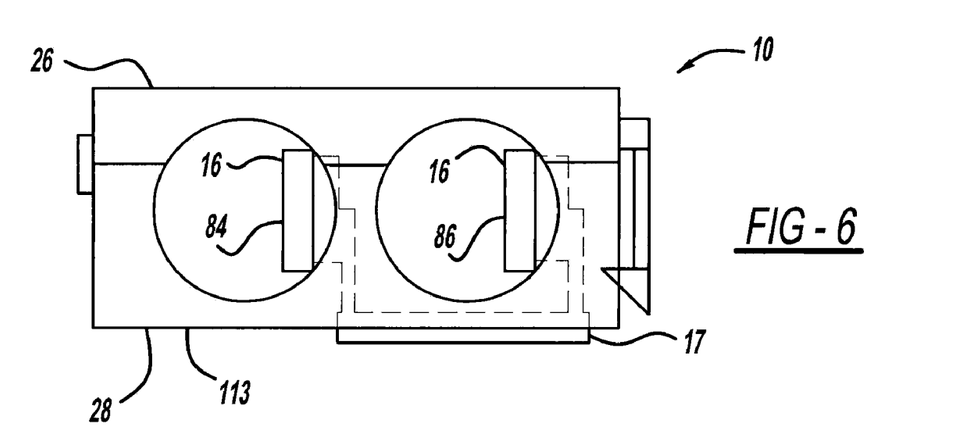
FIG. 6 depicts a side view of an insert portion of the conduit retaining bracket according to an embodiment of the present teachings.

FIG. 5 depicts triangular-shaped inserts 80, 82, which posses the advantage of being able to be made of a relatively smaller mass than the inserts 76, 78 of FIG. 4 when manufactured from the same material. Additionally, inserts 80, 82 may require less force to compress than relatively larger, or more massive, inserts. This may ease or speed insertion of a conduit into retaining bracket 10. FIG. 6 depicts rectangular inserts 84, 86 while inserts 88, 90, 92 depicted in FIG. 7 may be relatively smaller, and square when viewed in an end view. An advantage using two or more smaller cubes as an insert in one of the conduit holding parts 12, 14 is that the conduit may be centered relative to the overall insert 16. With continued reference to FIG. 7, centering of a tubular conduit is possible because insert 90 may be positioned in a recessed fashion relative to inserts 88, 92. Gap 97 is created by positioning insert 90 in a recessed fashion relative to inserts 88, 92 and provides a centering function between inserts 88, 92 for any conduit in the conduit hold part 12 that is forced against inserts 88, 92 thus causing their compression.

Figure 8:
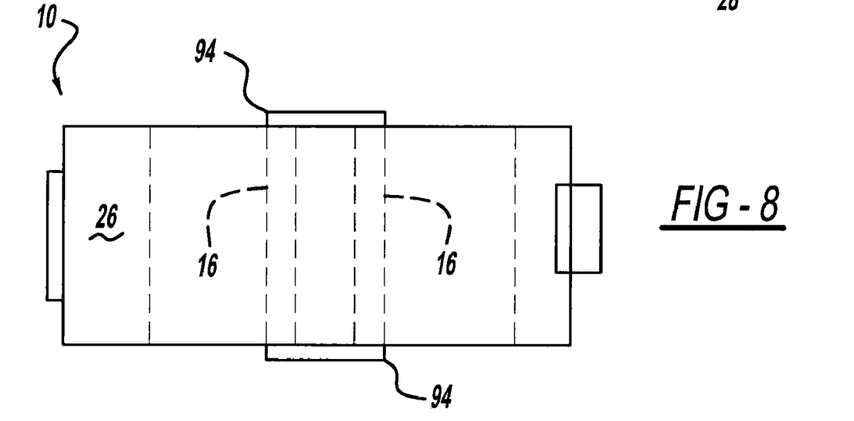
FIG. 8 depicts a top view of an insert portion of the conduit retaining bracket according to an embodiment of the present teachings.
Figure 9:
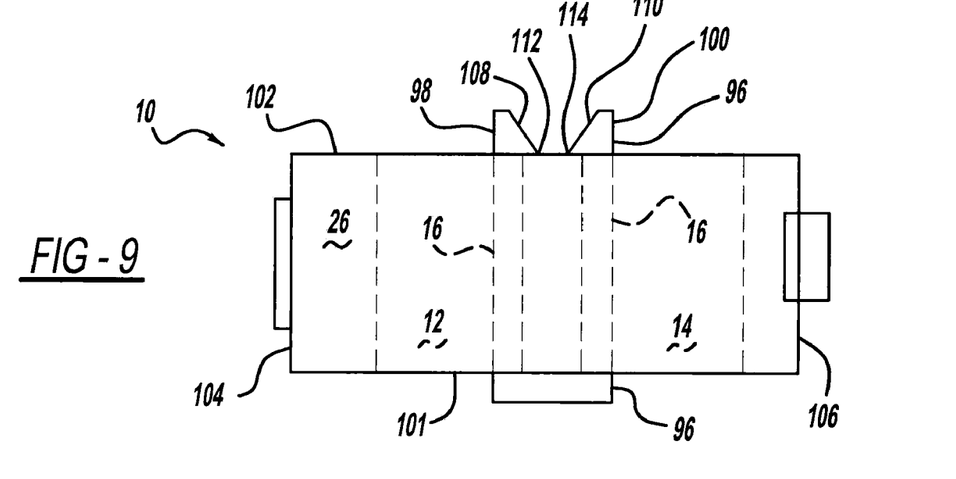
FIG. 9 depicts a top view of an insert portion of the conduit retaining bracket according to an embodiment of the present teachings.
Figure 10:
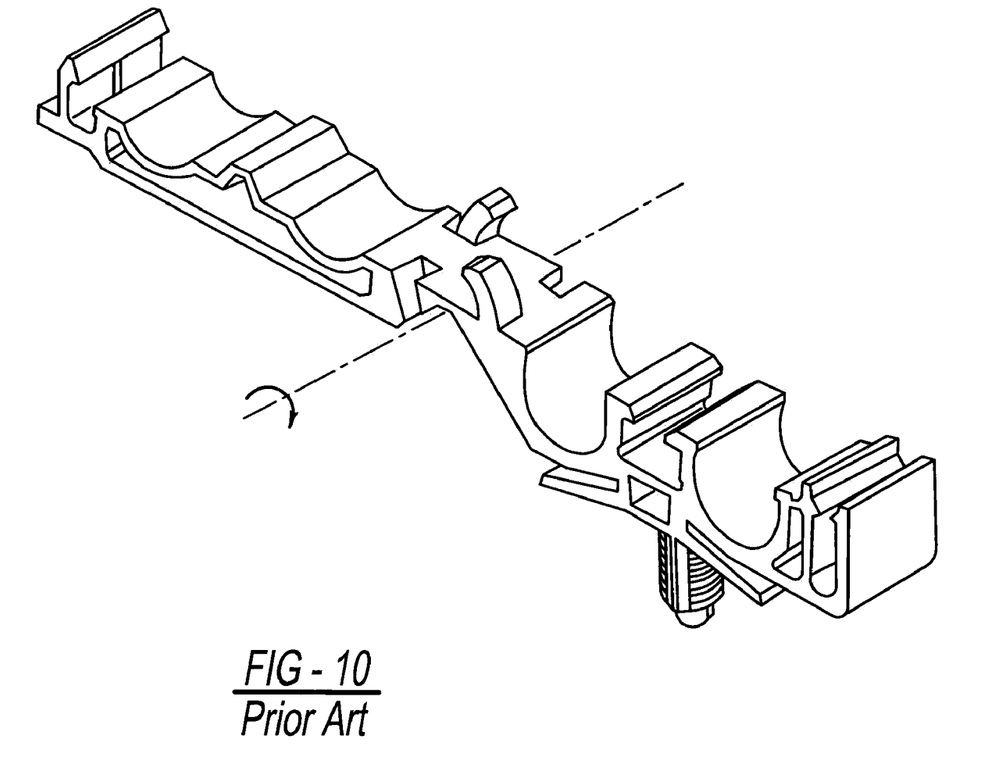
FIG. 10 is a view of a retaining bracket according to the prior art.

FIGS. 8 and 9 depict top views of retaining bracket 10 and exemplify methods of installing the inserts 16 and accompanying binders 94, 96 into a retaining bracket 10. With reference to FIG. 8, retaining bracket 10 may have an insert 16, such as a D-shaped insert or any conceivable shape, installed in each conduit holding part with binder 94 at each longitudinal end of the inserts 16 to connect to the inserts 16. More specifically, when viewed in a top view such as FIG. 8, binders 94, which may be parallel to each other, and inserts 16, which may be parallel to each other, may form a square or rectangular structure. The connection of binders 94 and inserts 16 may be prior to their installation in retaining bracket 10 and thus the resulting rectangular structure may be installed when the movable portion 26 is not in its closed position. That is, the rectangular structure may be placed into the stationary portion 28 before the movable portion 26 is closed and locked into place.

In another example configuration of inserts 16 and corresponding binders, FIG. 9 depicts a structure having prongs 98, 100 separated by an air gap in order that prongs 98, 100 do not contact each other. Prongs 98, 100 protrude from a long side 102 of the retaining bracket 10, relative to the ends that have short sides 104, 106. Continuing, prong 98 may have slanted surface 108 that faces slanted surface 110 of prong 100. Slanted surfaces 108, 110 may be skew surfaces relative to each other and facilitate installation of the retaining bracket 10, into position within the retaining bracket 10. More specifically, with a prong 98, 100 on an end of each insert 16, the retaining bracket 10 may be inserted from a first side of the retaining bracket 10 such that inserts 16 ultimately reside within the first conduit holding part 12 and the second conduit holding part 14. During initial installation of the retaining bracket 10 of FIG. 9, slant surfaces 108, 110 contact walls 68, 70 (see FIG. 1) causing prongs 98, 100 to move apart or away from each other until points 112, 114 of prongs 98, 100 return to their original, pre-installed position on the side opposite the initial installation side of the retaining bracket 10. When points 112, 114 snap into position on long side 102, as depicted in FIG. 9, after beginning installation on long side 101, installation of retaining bracket 10 is complete. Thus, binder 96, prongs 98, 100 and retainer 16 form a U-shaped combination capable of being inserted into retaining bracket 10 even with movable portion 26 installed over and locked onto stationary portion 28. This is an advantage that saves time because installation of the retaining bracket 10 may occur regardless of the position of movable portion 26.

Figure 7:
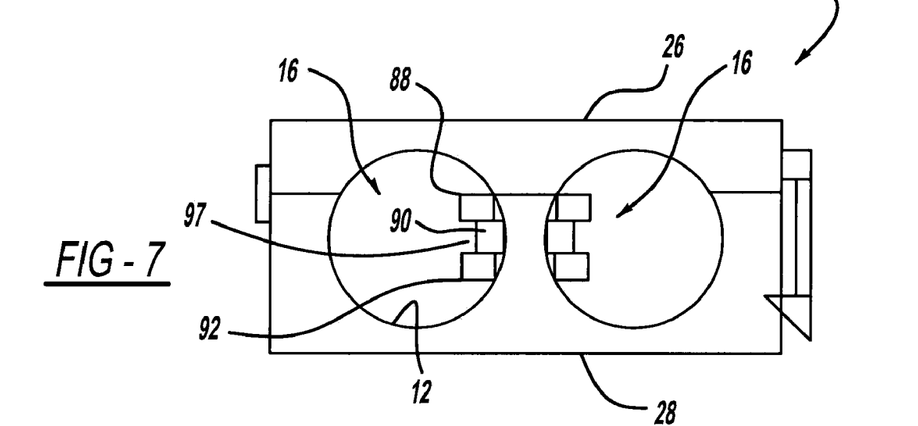
FIG. 7 depicts a side view of an insert portion of the conduit retaining bracket according to an embodiment of the present teachings.

Inserts 16 may be manufactured from a variety of materials such as rubber, plastic, metal or a hybrid of such materials, such as rubber coated plastic, rubber coated metal, or plastic coated metal. Inserts 16 may also be formed, such as by molding, into a variety of shapes that conform to an interference fit between retaining bracket 10 and the tubing or conduit to be secured within the retaining bracket 10. Examples of insert shapes are: semi-circular, as depicted in FIG. 4; triangular, as depicted in FIG. 5; rectangular, as depicted in FIG. 6, and elongated shapes as depicted in FIGS. 7-9. In FIG. 7, inserts 16 may have a rectangular-shaped end and be elongated or have a length that is at least equal to a length of conduit holding part 12, 14, which is where installed conduits may reside.

Binders that are joined or connected to the inserts in the various embodiments and configurations noted above may be made from rubber, plastic, or metal, for example. The binder cross-sectional shape may be square, rectangular or circular, and may depend on the shape of the insert to which it is connected. Binders may be flexible bands to connect inserts together and form a square or rectangular retaining bracket 10, for example, as depicted in FIGS. 1, 3A-3C, 8 and 9. As depicted in FIG. 8, binders 94 may be rigid pieces, or as depicted in FIG. 9, one binder 96 may be used in conjunction with prongs or clips 98, 100 so that inserts 16 may be installed into the retaining bracket 10 from a single long side 101. As depicted in FIG. 6, binder 17 may protrude from bottom side 113 of the retaining bracket 10. More specifically, binder 17 may be an offset style permitting rectangular inserts 84, 86 to be connected to binder 17 such that inserts 84, 86 protrude from binder 17 in the same direction, such as to the left as depicted in FIG. 6. With binder 17 configuration of FIG. 6, interference of the binder 17 with other conduit channels may be avoided.

As described and depicted in FIGS. 1-9, the inserts and binders may be used with a retaining bracket 10 to act as a retention device for tubing and other conduits. The retaining bracket 10 with the inserts and binders described also prevents rotation and sliding of conduits within the retaining bracket. Moreover, because inserts may be supplied in a compressible material, the inserts also provide a restoring force against conduits within the retaining bracket 10, which is in addition to any holding force the movable portion 26 and stationary portion 28 may provide. Furthermore, the inserts and binders as described may be used on hard tubing and flexible tubing, but any conduit or tubing must be stiffer or less compressible than the compressible insert material against which the tubing is forced.

In some applications, inserts and binders as described may provide vibration isolation between the tubing or conduit being secured and the article to which the retaining bracket 10 is attached. Even if a rigid, non-compressible insert is in use, it may be coated with an absorbing layer. For example, brake lines in an automobile or truck may be mounted in the retaining bracket 10. During use of the vehicle braking system, such as an anti-lock braking system, pulses may be created in the brake fluid running through the brake lines. The pulses create vibration and noise in the brake line which may be transmitted through retaining bracket 10 and into the frame of the vehicle. Thus, retaining bracket 10 may be used to reduce overall vehicle noise, vibration and harness experienced by a vehicle occupant if the insert(s) are rubber coated, for example.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A retaining bracket for holding conduit, the retaining bracket comprising:
   a stationary portion defining a first conduit holding portion;
   a movable portion that attaches to the stationary portion, the movable portion defining a first arcuate groove that together with the first conduit holding portion reside around a first conduit;

a first removable insert that resides within the first conduit holding portion;
a first wall of the first conduit holding portion; and
a removable binder that is connected to the first removable insert, the removable binder residing around the first wall of the first conduit holding portion.

2. The retaining bracket of claim 1, wherein the first removable insert is rigid and the removable binder is rigid.

3. The retaining bracket of claim 2, wherein the first removable insert and the removable binder are a single, unitary molded structure.

4. The retaining bracket of claim 2, wherein
the first removable insert and the removable binder are connected by welding.

5. The retaining bracket of claim 2, further comprising:
a closing prong that protrudes from the movable portion; and
a first hook that protrudes from the closing prong, wherein the stationary portion defines a gap in which the closing prong and first hook reside to lock the movable portion to the stationary portion.

6. The retaining bracket of claim 5, further comprising:
a second conduit holding portion defined in the stationary portion;
a second wall of the second conduit holding portion;
a second arcuate groove defined in the movable portion, wherein
the second arcuate groove and the second conduit holding portion together reside around a second conduit; and
a second removable insert that resides within the second conduit holding portion, wherein the removable binder is connected to the second removable insert, the removable binder residing over the second wall of the second conduit holding portion.

7. The retaining bracket of claim 6, wherein:
the removable binder is a rectangular frame that defines an open central area, and the first removable insert is non-compressible.

8. The retaining bracket of claim 6, wherein:
the first removable insert and the second removable insert are triangular and conform to the arcuate shape of the movable portion when the movable portion is in a locked position.

9. The retaining bracket of claim 1, wherein at least a part of the removable binder is located at an opposite side of the first wall from the first removable insert.

10. The retaining bracket of claim 1, wherein the removable binder also extends over an exterior surface of the first conduit holding portion.

11. The retaining bracket of claim 1, wherein the removable binder contacts an interior wall defining the first conduit holding portion and a wall exterior to the first conduit holding portion.

12. The retaining bracket of claim 1, wherein the removable binder surrounds the first wall.

13. A retaining bracket for holding conduit, the retaining bracket comprising:
an insert assembly having a first insert and a second insert;
an intermediate binder disposed between and connecting the inserts;
a stationary portion defining a first conduit holding portion and a second conduit holding portion;
a wall of the first conduit holding portion;
a wall of the second conduit holding portion; and
a movable portion that is attachable to the stationary portion, the movable portion defining a first arcuate groove and a second arcuate groove, the first conduit holding portion and the first arcuate groove securing a first conduit, the second conduit holding portion and the second arcuate groove securing a second conduit, wherein the first and second inserts abut against the first and second conduits, and the first insert contacts a wall of the first conduit holding portion and the second insert contacts a wall of the second conduit holding portion.

14. The retaining bracket of claim 13, wherein:
the inserts are D-shaped;
the first and second conduit holding portions are semi-circular;
the binder is a rigid frame and defines a center area; and
the wall of the first conduit holding portion and the wall of the second conduit holding portion protrude through the center area of the binder.

15. A retaining bracket for holding conduit, the retaining bracket comprising:
an insert assembly having a first insert and a second insert; and
an intermediate binder disposed between and connecting the inserts,
a stationary portion defining a first conduit holding portion and a second conduit holding portion;
a movable portion that is attachable to the stationary portion,
wherein the binder resides only outside of a perimeter of the stationary portion and the movable portion, and against a first long side of the stationary portion.

16. The retaining bracket of claim 15, further comprising:
a first prong at an end of the first insert; and
a second prong at an end of the second insert, wherein the first and second prongs reside against a second long side of the stationary portion.

17. The retaining bracket of claim 16, wherein:
the first long side and the second long side of the stationary portion are parallel, and
the first long side and the second long side of the stationary portion define openings for the semi-circular first conduit holding portion and the semi-circular second conduit holding portion.

18. The retaining bracket of claim 17, wherein:
the inserts and the binder are rigid, and
the inserts are semi-circular when viewed in transverse cross-section.

19. A retaining bracket for holding conduit, the retaining bracket comprising:
an insert assembly having a first D-shaped insert and a second D-shaped insert;
a intermediate binder disposed between and connecting the D-shaped inserts;
a stationary portion defining a semi-circular first conduit holding portion and a semi-circular second conduit holding portion;
a movable portion that is foldable against the stationary portion, the movable portion defining a first arcuate groove and a second arcuate groove, the first conduit holding portion aligning with the first arcuate groove to surround a first conduit and the second conduit holding portion aligning with the second arcuate groove to surround a second conduit;
a first non-compressible binder piece contacting a first long side of the stationary portion;
a first insert with a first insert first end connected to the first rigid binder piece; and
a second insert with a second insert first end connected to the first rigid binder piece, the first insert residing within the first conduit holding portion and the second insert residing within the second conduit holding portion.

20. The retaining bracket of claim 19, further comprising:

a first insert second end;

a second insert second end; and a second rigid binder piece connected to the first insert second end and the second insert second end, wherein the first insert contacts a wall of the first conduit holding portion and the second insert contacts a wall of the second conduit holding portion.

21. The retaining bracket of claim 20, wherein:

the first and second inserts are D-shaped;

the first rigid binder piece, the second rigid binder piece, the first insert and the second insert are connected serially to form a rectangle, and the wall of the first conduit holding portion and the wall of the second conduit holding portion protrude through the rectangle.

22. The retaining bracket of claim 21, wherein the first rigid binder and the second rigid binder reside only outside of a perimeter of the stationary portion and the movable portion.

23. The retaining bracket of claim 19, further comprising:

a first insert second end;

a second insert second end;

a first prong attached to the first insert second end; and a second prong attached to the second insert second end, wherein:

the first and second prongs contact a second long side of the stationary portion, the first long side and the second long side of the stationary portion are parallel, and the first long side and the second long side of the stationary portion each define an opening for the semi-circular first conduit holding portion and the semicircular second conduit holding portion.

* * * * *